(12) United States Patent
Wright et al.

(10) Patent No.: US 12,679,258 B2
(45) Date of Patent: Jul. 14, 2026

(54) LAWN CARE VEHICLE WITH IMPROVED SEAT ISOLATION

(71) Applicant: HUSQVARNA AB, Huskvarna (SE)

(72) Inventors: Chris Wright, Kannapolis, NC (US);
Chris Van Buren, Charlotte, NC (US);
Adam Schoonmaker, Monroe, NC (US); David Estey, Huntersville, NC (US); Russell Anderson, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 558 days.

(21) Appl. No.: 18/011,653

(22) PCT Filed: Oct. 20, 2020

(86) PCT No.: PCT/US2020/056504
§ 371 (c)(1),
(2) Date: Dec. 20, 2022

(87) PCT Pub. No.: WO2022/071968
PCT Pub. Date: Apr. 7, 2022

(65) Prior Publication Data
US 2023/0256876 A1      Aug. 17, 2023

Related U.S. Application Data

(60) Provisional application No. 63/085,509, filed on Sep. 30, 2020.

(51) Int. Cl.
B60N 2/38      (2006.01)
B60N 2/10      (2006.01)
(Continued)

(52) U.S. Cl.
CPC ................. B60N 2/38 (2013.01); B60N 2/10 (2013.01); B60N 2/50 (2013.01); A01D 34/82 (2013.01)

(58) Field of Classification Search
CPC ... B60N 2/38; B60N 2/10; B60N 2/50; B60N 2/54; B60N 2/542; B60N 2/502; A01D 67/04
(Continued)

(56) References Cited

U.S. PATENT DOCUMENTS 3,770,235 A      11/1973   Klapproth et al.
3,826,530 A  *   7/1974   Hoffmeyer ......... B62D 49/0671
                                                            280/282
(Continued)

FOREIGN PATENT DOCUMENTS

AU      2012216831 A1   10/2012
CN      106114298 A     11/2016
(Continued)

OTHER PUBLICATIONS

International Search Report and Written Opinion for International Application No. PCT/US2020/056504 mailed May 25, 2021.
(Continued)

*Primary Examiner* — Vivek D Koppikar
*Assistant Examiner* — Wenwei Zhuo
(74) *Attorney, Agent, or Firm* — Burr & Forman

(57)      ABSTRACT

A riding lawn care vehicle may include a frame to which wheels of the riding lawn care vehicle are attachable, a seat from which an operator of the riding lawn care vehicle is enabled to access steering controls for the riding lawn care vehicle, a seat mounting structure to which the seat is mounted, an isolation assembly providing vibration isolation between the frame and the seat mounting structure, and a hinge assembly configured to enable the seat to be pivoted via the seat mounting structure from an operating position to a pivoted position in which an area under the seat is exposed
(Continued)

or accessible. The hinge assembly and at least a portion of the isolation assembly may be integrated to isolate the seat from vibrations at the frame.

19 Claims, 14 Drawing Sheets

(51) Int. Cl.
  *B60N 2/50*    (2006.01)
  *A01D 34/82*    (2006.01)

(58) Field of Classification Search
  USPC .......... 296/65.05, 65.02, 65.09, 63; 297/326, 297/335, 316, 451.7; 56/323
  See application file for complete search history.

(56)    References Cited

U.S. PATENT DOCUMENTS

| | | | | | |
|---|---|---|---|---|---|
| 4,198,092 | A | * | 4/1980 | Federspiel | ............... B60N 2/10 248/575 |
| 5,037,155 | A | * | 8/1991 | Holm | ....................... B60N 2/38 296/65.13 |
| 5,876,085 | A | * | 3/1999 | Hill | ....................... B60N 2/502 296/65.02 |
| 6,499,282 | B1 | * | 12/2002 | Velke | ................. A01D 34/6806 56/14.7 |
| 6,669,293 | B2 | | 12/2003 | Moore | |
| 7,690,178 | B2 | * | 4/2010 | Hagen | .................... A01D 42/00 56/320.1 |
| 8,146,899 | B2 | | 4/2012 | Hiser | |
| 10,864,832 | B2 | * | 12/2020 | Stover | .................... B62D 21/03 |
| 11,917,944 | B2 | * | 3/2024 | Forrest | .................. A01D 34/82 |
| 2002/0008418 | A1 | * | 1/2002 | Moore | .................. B60N 2/542 297/335 |
| 2004/0090338 | A1 | * | 5/2004 | Nishino | ................. B60N 2/502 340/665 |
| 2008/0202874 | A1 | * | 8/2008 | Scheele | ............. B62D 33/0604 188/297 |
| 2009/0184448 | A1 | * | 7/2009 | Hiser | .................... B60N 2/542 267/140.11 |

FOREIGN PATENT DOCUMENTS

| | | | | |
|---|---|---|---|---|
| EP | 2193703 | A1 | 6/2010 | |
| KR | 20250054492 | A * | 4/2025 | ............ A01B 51/00 |
| WO | 2008/042894 | A2 | 4/2008 | |

OTHER PUBLICATIONS

TractorByNet, My $10 BX Suspension Seat Mod', Retrieved From https://www.tractorbynet.com/forums/kubota-owning-operating/216316-my-10-bx-suspension-seat.html, Aug. 11, 2011, 4 Pages.

Deck Discharge Chute Modification Test and Prognosis—Hustler Raptor / Big Dog Alpha, Retrieved From https://www.youtube.com/watch?v=NVRtDIBqpzo, Jul. 2, 2018, 2 Pages.

\* cited by examiner

LAWN CARE VEHICLE WITH IMPROVED SEAT ISOLATION

TECHNICAL FIELD

Example embodiments generally relate to lawn care vehicles and, more particularly, to riding lawn care vehicles with a fully isolated seat that is also hingedly attached to improve space utilization.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

Riding lawn mowers typically include a seat on which the operator sits while operating the vehicle. Since riding lawn mowers are often preferred for larger jobs, the provision of the seat is, at least in part, for the comfort of the operator. However, if the seat is not isolated from the bumps or oscillations associated with traversing uneven terrain (or even engine vibrations), it can become uncomfortable for the operator.

To address this problem, seat isolation systems have been provided to dampen or inhibit vibrations from reaching the seated operator. However, such isolation systems have typically suffered from being limited in their performance by virtue of employing strategies that are limiting in one way or another.

BRIEF SUMMARY OF SOME EXAMPLES

In one example embodiment, a riding lawn care vehicle is provided. The riding lawn care vehicle may include a frame to which wheels of the riding lawn care vehicle are attachable, a seat from which an operator of the riding lawn care vehicle is enabled to access steering controls for the riding lawn care vehicle, a seat mounting structure to which the seat is mounted, an isolation assembly providing vibration isolation between the frame and the seat mounting structure, and a hinge assembly configured to enable the seat to be pivoted via the seat mounting structure from an operating position to a pivoted position in which an area under the seat is exposed or accessible. The hinge assembly and at least a portion of the isolation assembly may be integrated to isolate the seat from vibrations at the frame.

In another example embodiment, a vibration isolation system for a riding lawn care vehicle may be provided. The system may include a seat from which an operator of the riding lawn care vehicle is enabled to access steering controls for the riding lawn care vehicle, a seat mounting structure to which the seat is mounted, an isolation assembly providing vibration isolation between a frame of the riding lawn care vehicle and the seat mounting structure, and a hinge assembly configured to enable the seat to be pivoted via the seat mounting structure from an operating position to a pivoted position in which an area under the seat is exposed or accessible. The hinge assembly and a portion of the isolation assembly both pivot responsive to pivoting the seat to the pivoted position.

Some example embodiments may improve an operator's ability to utilize potential space available on the vehicle, while also maximizing operator comfort. The user experience associated with operating the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1A:
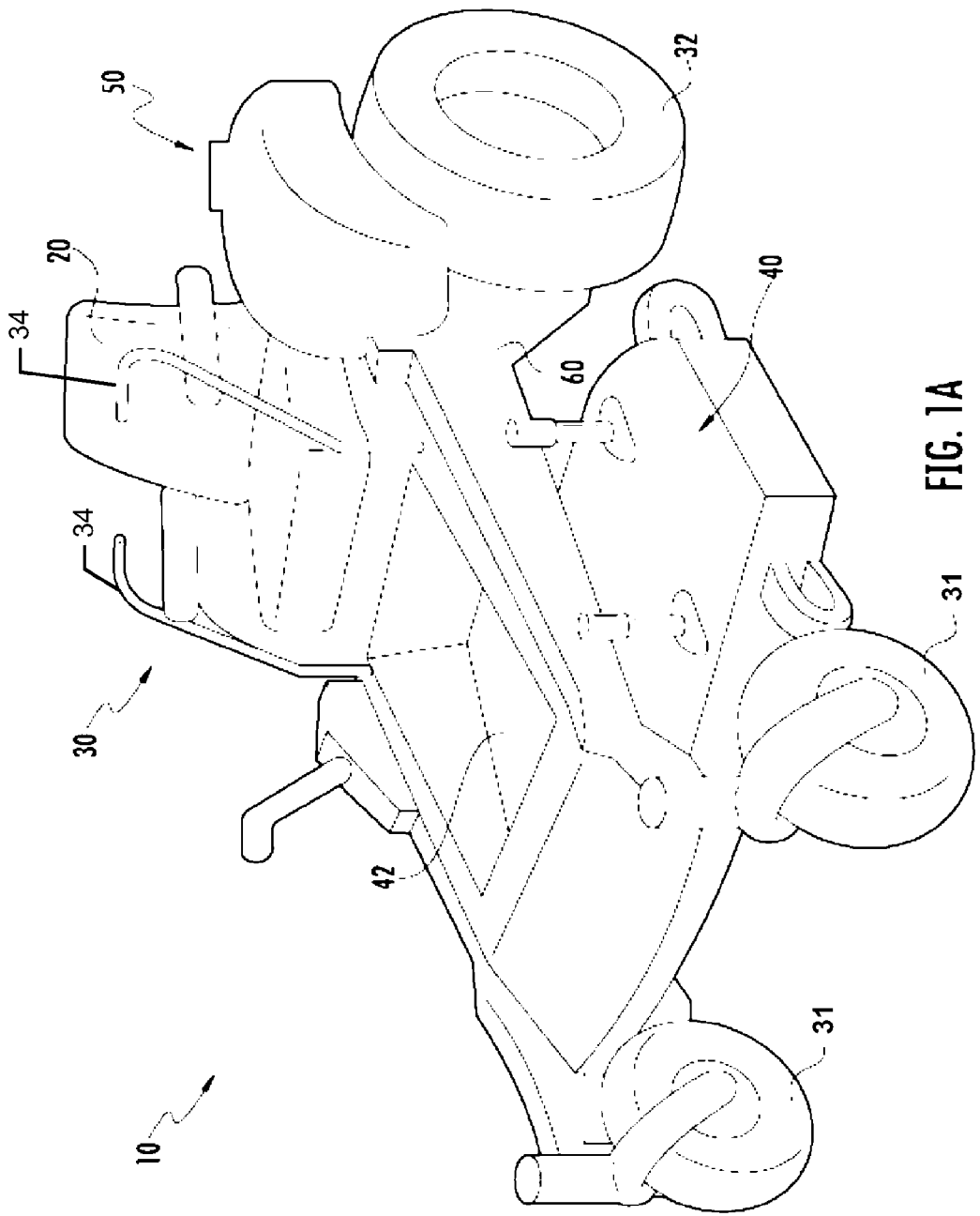
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the comfort of operators of riding lawn care vehicles, while still maximizing the space available on the riding lawn care vehicle (e.g., by enabling access to space under the seat). In this regard, to the extent a design for a vehicle may enable the space below the riding operator (i.e., under the seat) to be utilized (e.g., for storage), it may be desirable to place the seat on some sort of hinged mount. The operator may therefore tilt the seat forward via the hinge in order to access the space under the seat. In one typical isolation strategy intended to allow access to space under the seat in this way, the seat may be isolated only at the end opposite the hinge. For example, if the hinge is in the front of the seat, the isolators may be located only at the back of the seat. In other hinged strategies, the isolators may be built into the structure of the seat itself. However, this enlarges the seat and decreases space so that the ability to access space under the seat is substantially limited. In yet another strategy for maximizing seat isolation, the seat may include isolators in both the front and rear of the seat, but such designs are typically not hinged, so there is no access to the space under the seat. Accordingly, example embodiments provide a hinge assembly that is itself isolated by incorporating isolating devices (e.g., springs, rubber bumpers, dampers, coilovers, etc.) into the hinge assembly. Seat isolation may thereby be enhanced, while still maximizing both the space under the seat and the ability to access such space.

Figure 1B:
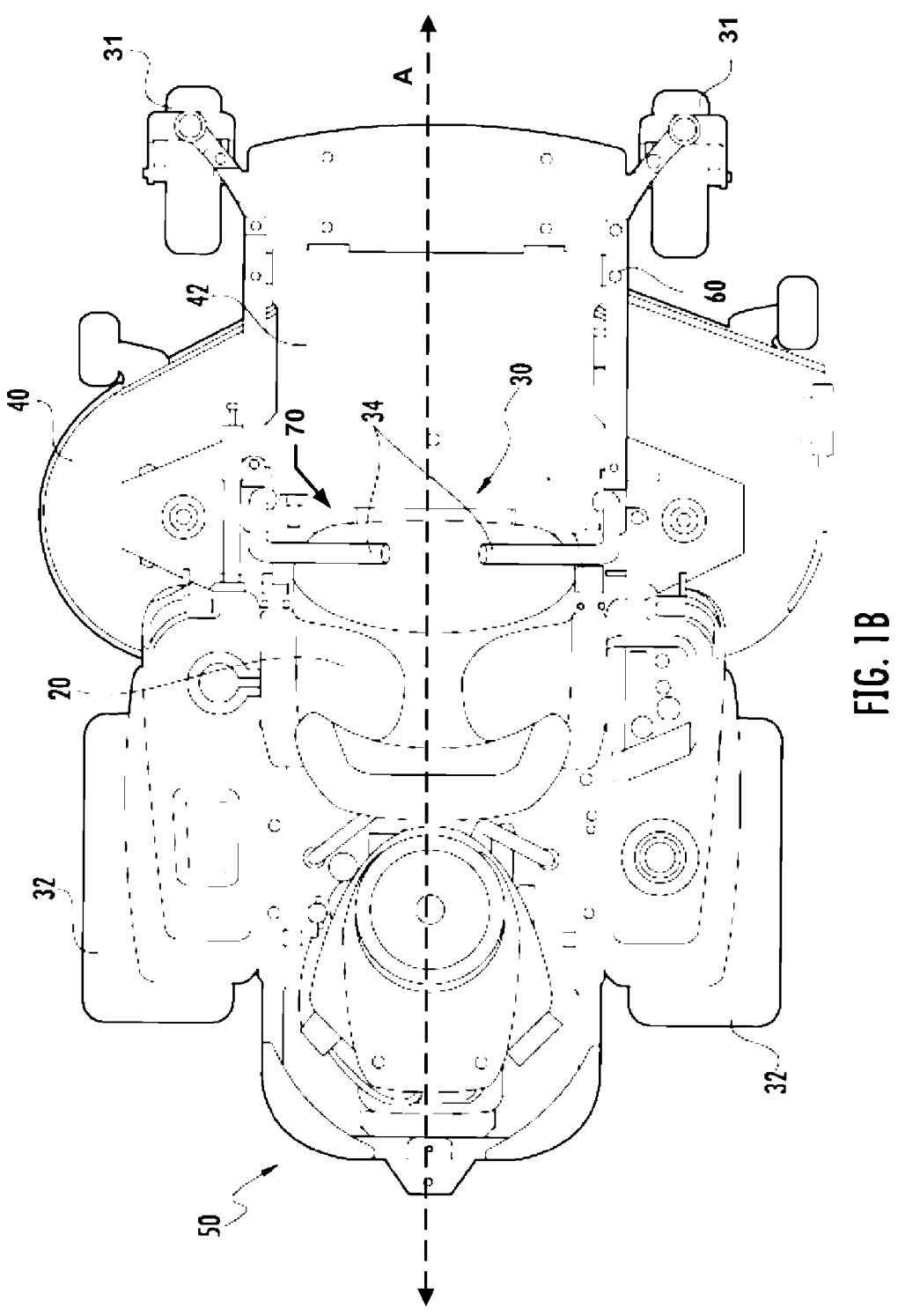
FIG. 1B illustrates a top view of the riding lawn care vehicle according to an example embodiment.

FIG. 1A illustrates a perspective view of a riding lawn care vehicle 10 and FIG. 1B illustrates a top view of the riding lawn care vehicle 10 according to an example embodiment. The riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

In the depicted example, the operator may sit on the seat 20, which may be disposed between steering levers 34 of the steering assembly 30 to provide input for steering of the riding lawn care vehicle 10 via the steering assembly 30. The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31.

In some embodiments, a footrest 42 may also be positioned above the cutting deck 40 forward of the seat 20 to enable the operator to rest his or her feet thereon while seated in the seat 20. In the pictured embodiment, an engine 50 of the riding lawn care vehicle 10 is disposed to the rear of a seated operator. However, in other example embodiments, the engine 50 could be in different positions such as in front of or below the operator. The engine 50 may be operably coupled to one or more of the wheels 31 and/or 32 (in this case only to the rear wheels 32) to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

As can be appreciated from FIG. 1A, the footrest 42 may be substantially lower (in elevation) than the seat 20 in order to comfortably support a seated operator on the seat 20. This results in an elevated seat 20 that is disposed atop a seat mounting structure 70 that is operably coupled to the frame 60. Particularly when the engine 50 is disposed to the rear of the seat 20, the space under the seat 20 and behind/under the seat mounting structure 70 may be advantageously utilized for storage. Thus, it may be desirable to enable maximization of the space under the seat 20, and the ability to access such space, while still providing good isolation for the seat 20.

Figure 2:
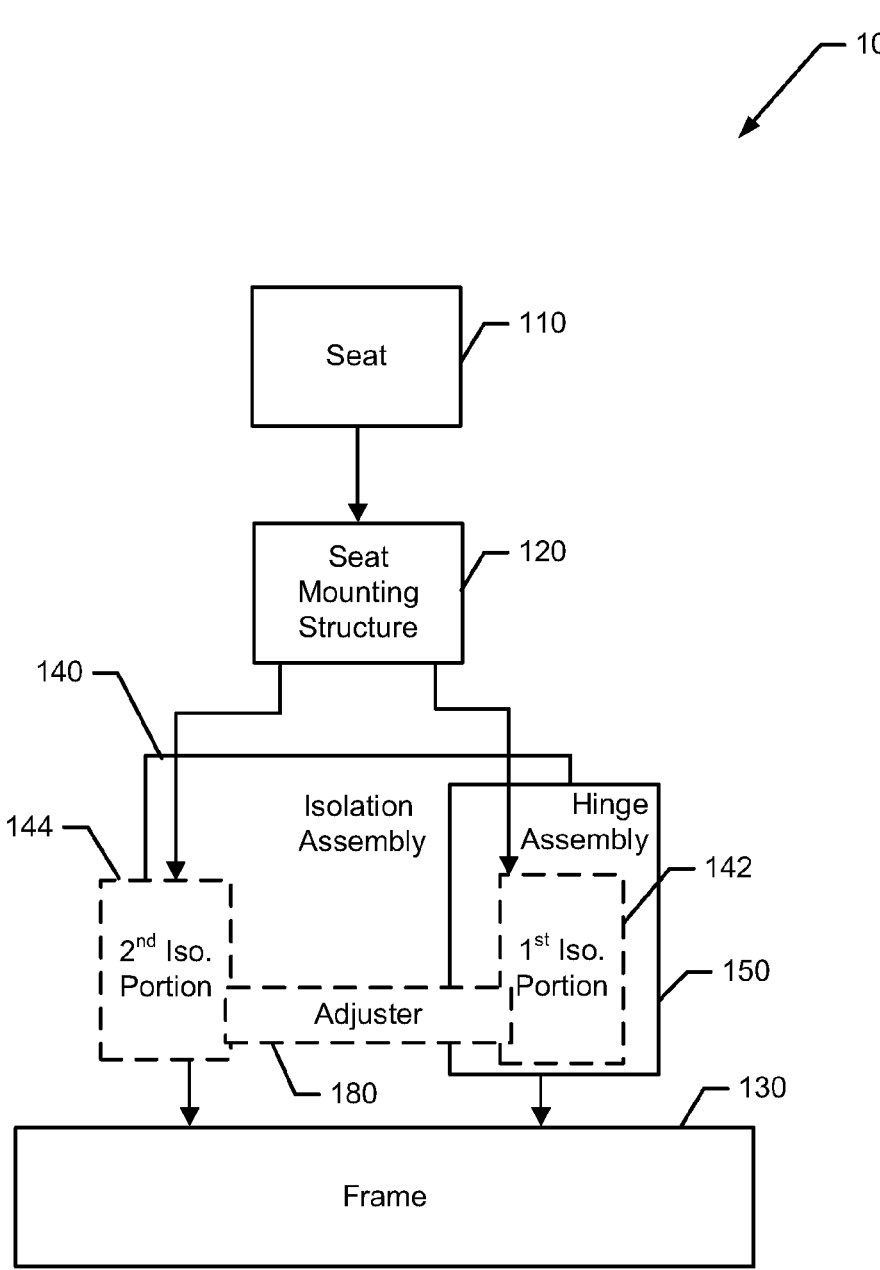
FIG. 2 illustrates a block diagram of a seat isolation system according to an example embodiment.
Figure 3:
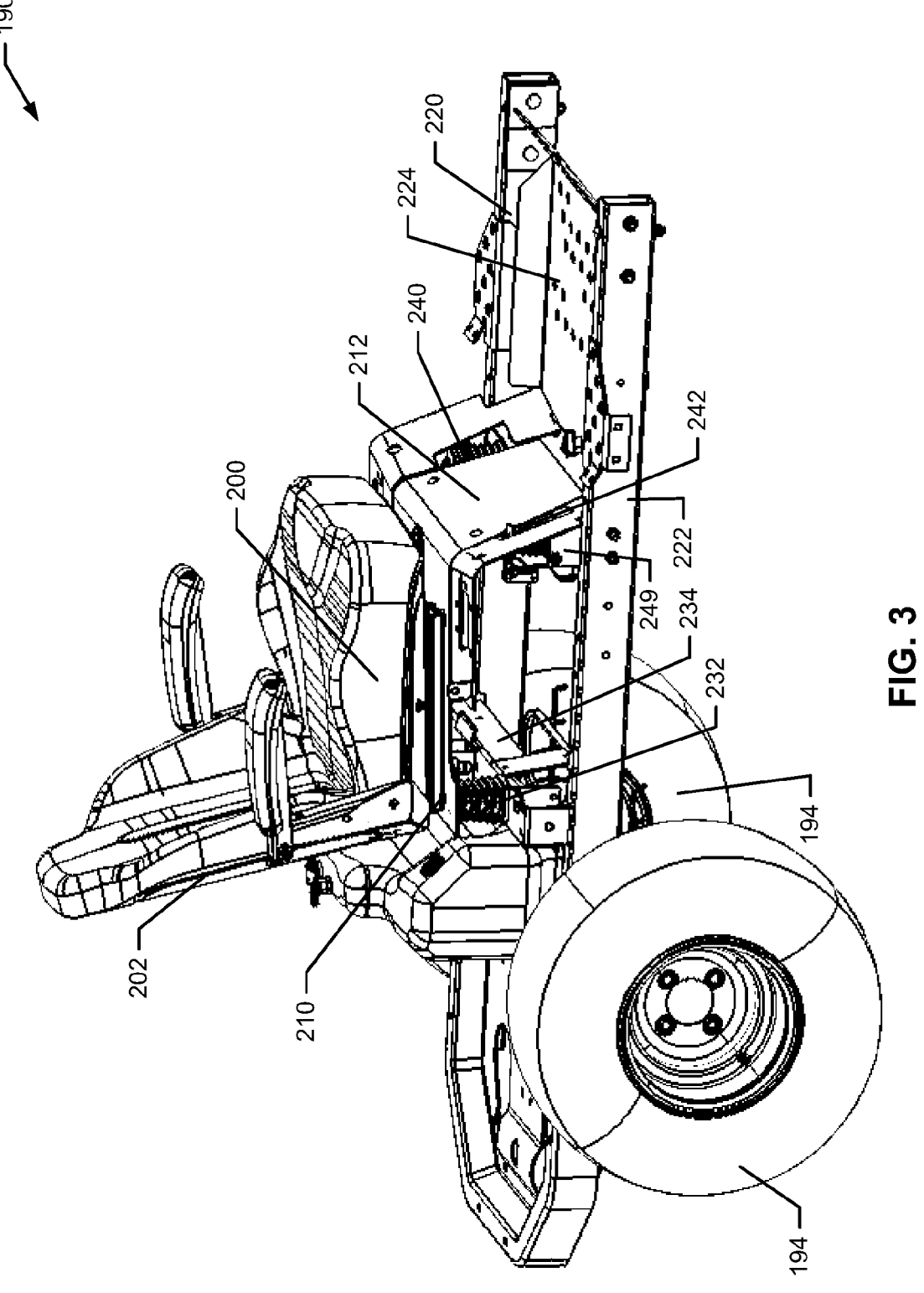
FIG. 3 illustrates a perspective view of a riding lawn care vehicle with a seat in the operating position according to an example embodiment.

FIG. 2 illustrates a block diagram of some components/assemblies associated with a seat isolation system 100 of an example embodiment. As shown in FIG. 2, the seat isolation system 100 may include a seat 110, seat mounting structure 120 and frame 130 (which may correspond to the seat 20, seat mounting structure 70 and frame 60 described above). The seat isolation system 100 may also include an isolation assembly 140 that is configured to isolate the seat 110 from vibrations communicated through the frame 130. The seat isolation system 100 may also include a hinge assembly 150 configured to enable the seat 110 to be moved from an in-use or operating position to a pivoted position, which may expose the area under the seat 110 to allow the operator access to the area under the seat 110 (e.g., for storage).

As shown in FIG. 2, the seat mounting structure 120 (and therefore also the seat 110) may have no direct connection to the frame 130. Instead, operable coupling of the seat 110 and seat mounting structure 120 to the frame 130 is only provided via the isolation assembly 140. Yet, the seat 110 is still movable between the operating position and the pivoted position due to the inclusion of the hinge assembly 150. Whereas the hinge assembly of a conventional design is typically a direct connection between the seat (or seat mounting structure) and the frame, the isolation assembly 140 of an example embodiment (or at least a portion thereof) is incorporated into the hinge assembly 150 so that even the hinge assembly 150 does not provide a path for direct coupling of vibration energy from the frame 130 to the seat.

The isolation assembly 140 of FIG. 2 includes a first isolation portion 142 associated with a first side of the seat 110 and/or seat mounting structure 120, and a second isolation portion 144 associated with a second side of the seat 110 or seat mounting structure 120. In an example embodiment, the hinge assembly 150 may define a pivot axis about which the seat 110 and the seat mounting structure 120 may pivot when transiting between the operating position and the pivoted position. The hinge assembly 150 may therefore be located at and associated with only one of the first side or the second side of the seat 110 and/or seat mounting structure 120. Although not required, the isolation assembly 140 may also include an adjuster 180 to enable adjustment of the first isolation portion 142 and/or the second isolation portion 144. Moreover, to the extent the first isolation portion 142 is integrated into the hinge assembly 150, adjustment may also impact the hinge assembly 150 in some cases.

If the seat 110 pivots forward or rearward, the pivot axis may extend laterally across the vehicle (i.e., substantially perpendicular to the longitudinal axis or longitudinal centerline of the vehicle) at either a front side (e.g., the first side) of the seat 110 or seat mounting structure 120 (for a forward pivot) or a rear side (e.g., the second side) of the seat 110 or seat mounting structure 120 (for a rearward pivot). Similarly, for a pivot of the seat 120 or seat mounting structure 120 to the right or left, the pivot axis would extend parallel to the longitudinal axis of the vehicle, and be located on the same lateral side of the vehicle as the pivot direction.

Accordingly, as shown in FIG. 2, the first isolation portion 142 is associated with the hinge assembly 150 and isolates a first side (e.g., front side for a forward pivot) of the seat 110 and seat mounting structure 120. Meanwhile, the second isolation portion 144 is not associated with (or connected to) the hinge assembly 150. The second isolation portion 144 is instead used to isolate the second side (e.g., rear side for the forward pivot) of the seat 110 and seat mounting structure 120. Moreover, as shown in FIG. 2, the first isolation portion 142 is integrated into (or incorporated in) the hinge assembly 150.

FIGS. 3-13 show various different views of example structures that may be used to employ the component/assemblies discussed above in reference to FIG. 2. Such structures are provided on an example riding lawn care vehicle 190, which includes front wheels 192 and rear wheels 194 (and is generally similar in structure to the riding lawn care vehicle 10 of FIGS. 1A and 1B). Referring to FIGS. 3-13, the seat 110 of FIG. 2 may include a seat base 200 and seat back 202. The seat mounting structure 120 may be defined by or include base support 210 and pivot member 212. The frame 130 may be defined by or include a first lateral frame member 220 and a second lateral frame member 222. A footrest or foot support platform 224 may extend between the first and second lateral frame members 220 and 222 forward of the pivot member 212. The second isolation portion 144 may be defined by or include a first isolator 230, a second isolator 232, and an isolator support bracket 234. The first isolation portion 142 may be defined by or include a third isolator 240 and a fourth isolator 242. The first isolation portion 142 may also include a frame engaging bracket 244 and a seat mount engaging bracket 246, which may also form a portion of the hinge assembly 150 (thereby integrating the hinge assembly 150 and the first isolation portion 142).

As can be appreciated from FIGS. 3-13, the first and second lateral frame members 220 and 222 may extend laterally from a front end to a rear end of the riding lawn care vehicle 190. The first and second lateral frame members 220 and 222 may extend substantially parallel to each other and the longitudinal centerline of the vehicle 190. However, in some cases, the first and second lateral frame members 220 and 222 may extend to form a small angle between each other and/or the longitudinal centerline of the vehicle 190. The first and second lateral frame members 220 and 222 may typically be steel or other rigid beams to which other components/assemblies are attached.

The seat base 200, seat back 202, base support 210 and the pivot member 212 of an example embodiment may be located between the first and second lateral frame members 220 and 222 (e.g., centered therebetween). The base support 210 may be a substantially flat or plate-like steel or other rigid component to which the seat base 200 may be mounted. However, the base support 210 could alternatively be formed by a collection of beams or rails instead of being plate-like in structure. Similarly, although the pivot member 212 of this example is shown as a metal plate, the pivot member 212 could also alternatively be embodied as a collection of rails or beams. In this example, the pivot member 212 and base support 210 are portions of the same unitary metallic plate, with a bend formed at an intersection between the portions. The bend and intersection in this example are located at a front end of the base support 210 and upper portion of the pivot member 212. The base support 210 is generally parallel to the ground when the seat base 200 is in the operating position.

The first, second, third and fourth isolators 230, 232, 240 and 242 may each be similar in structure and composition in some cases. Although, it is also possible that they may be different from each other, it is likely that the first and second isolators 230 and 232 would be similar to each other and the third and fourth isolators 240 and 242 would also be similar to each other and, at least each respective pair of isolators would therefore be similar in structure and function. In this example, the first, second, third and fourth isolators 230, 232, 240 and 242 are embodied as rubber bumpers. However, springs, gas shock absorbers, coilovers, or other damping/isolating devices may alternatively be employed. Moreover, in some example embodiments, any or all of the first, second third and fourth isolators 230, 232, 240 and 242 may be adjustable (e.g., with adjustable springs or dampers).

Figure 4:
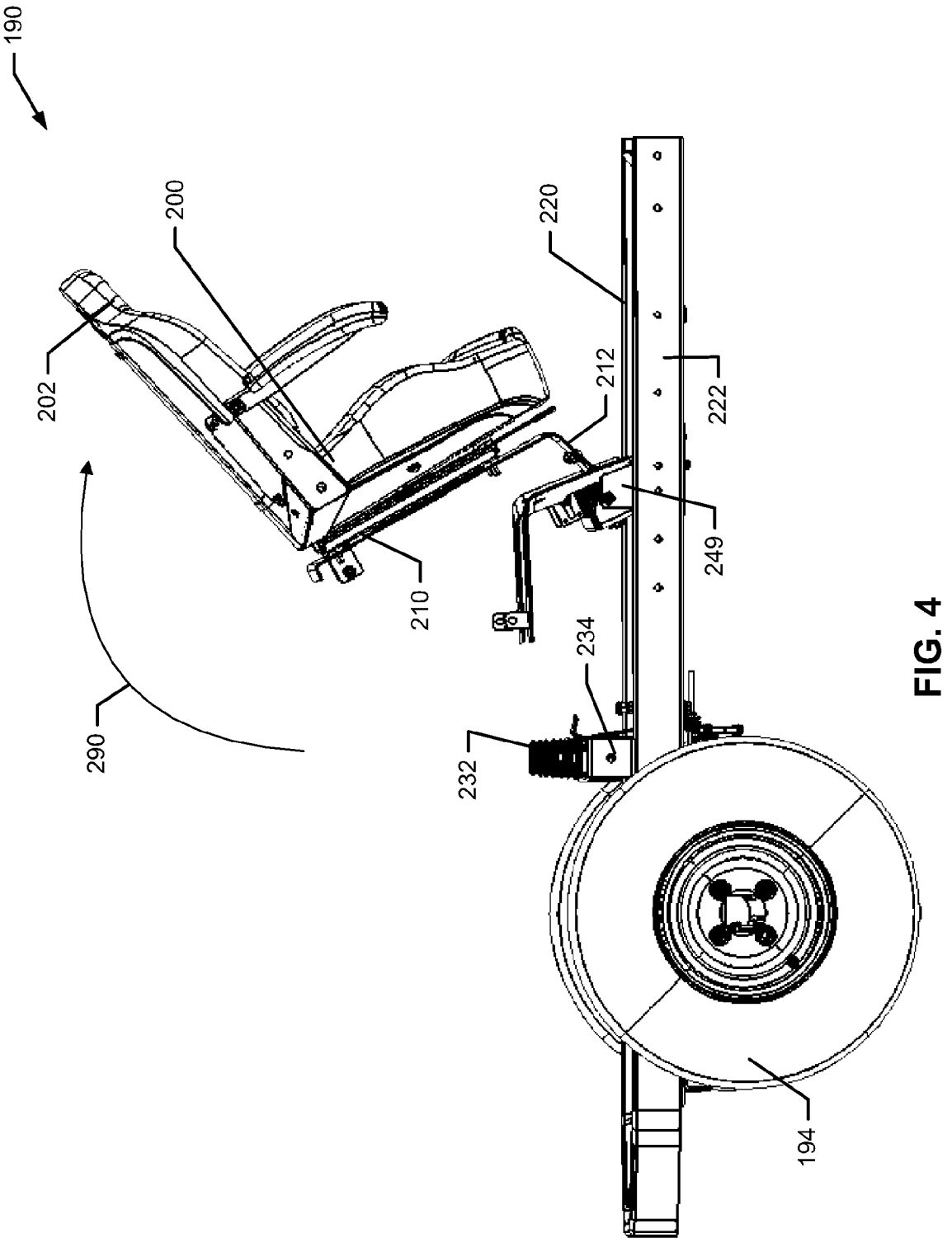
FIG. 4 illustrates a perspective view of the riding lawn care vehicle with the seat in a pivoted position in accordance with an example embodiment.
Figure 5:
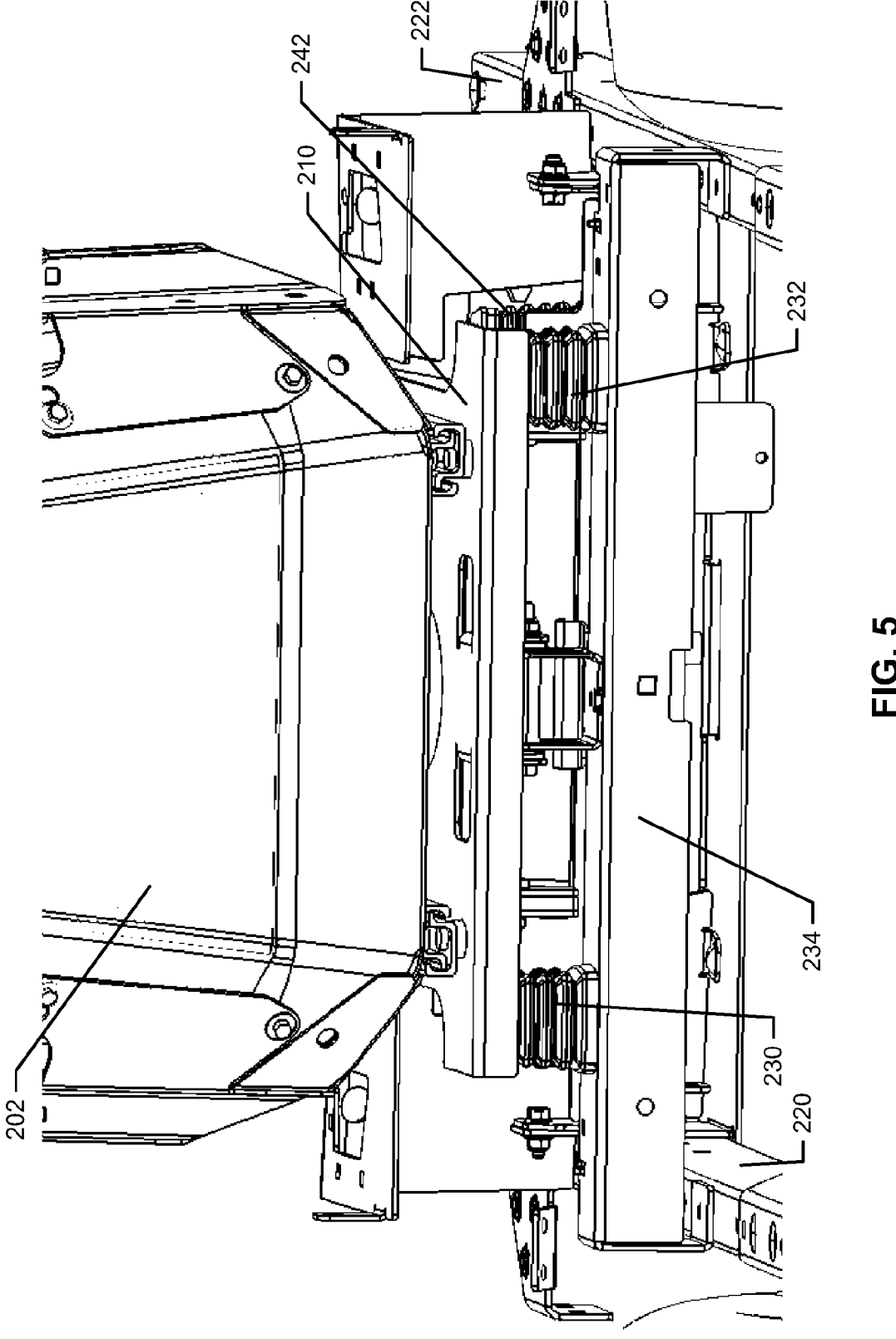
FIG. 5 illustrates a rear view of various components of an isolation system in accordance with an example embodiment.
Figure 6:
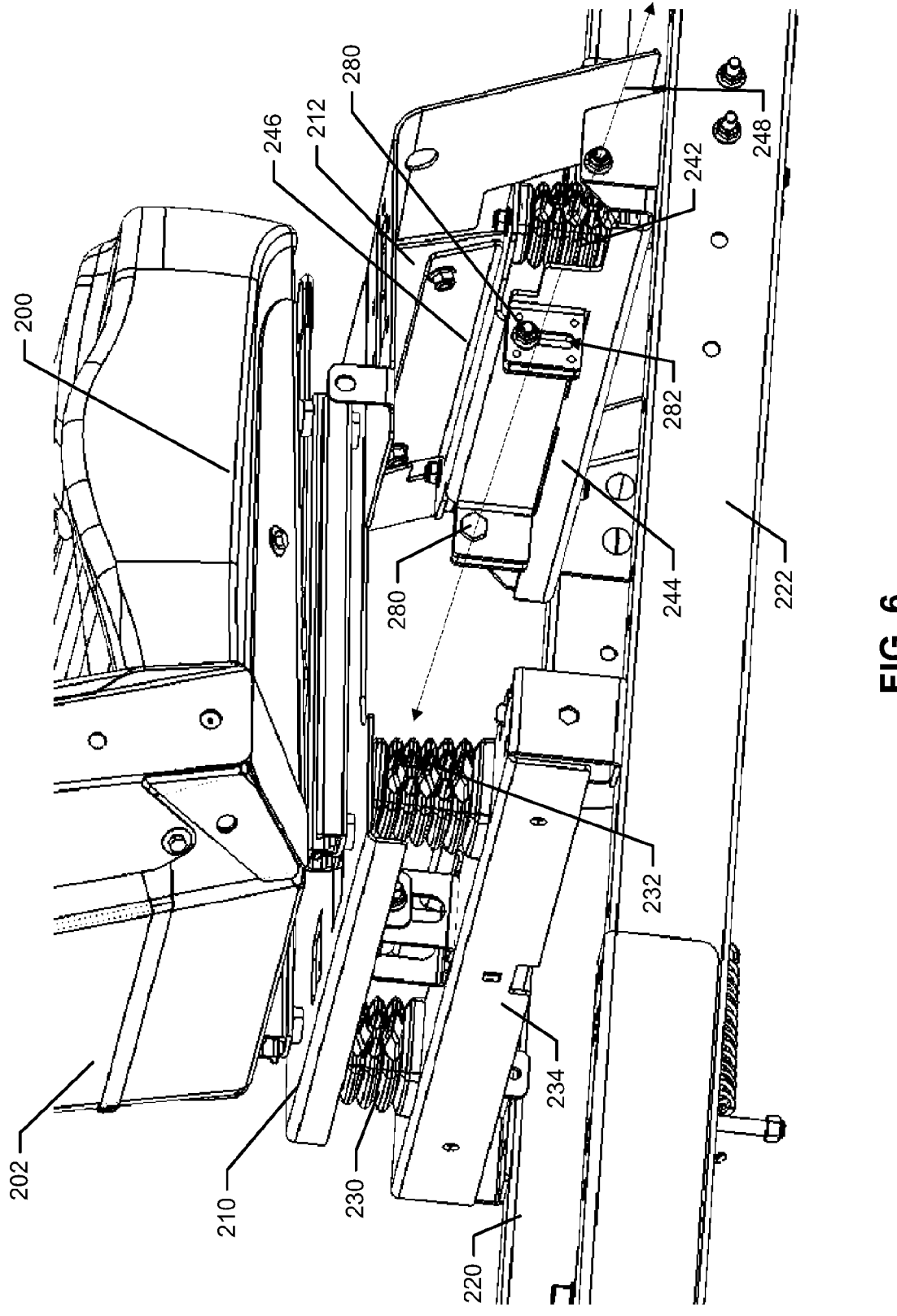
FIG. 6 is a rear perspective view of various components of the isolation system in accordance with an example embodiment.
Figure 7:
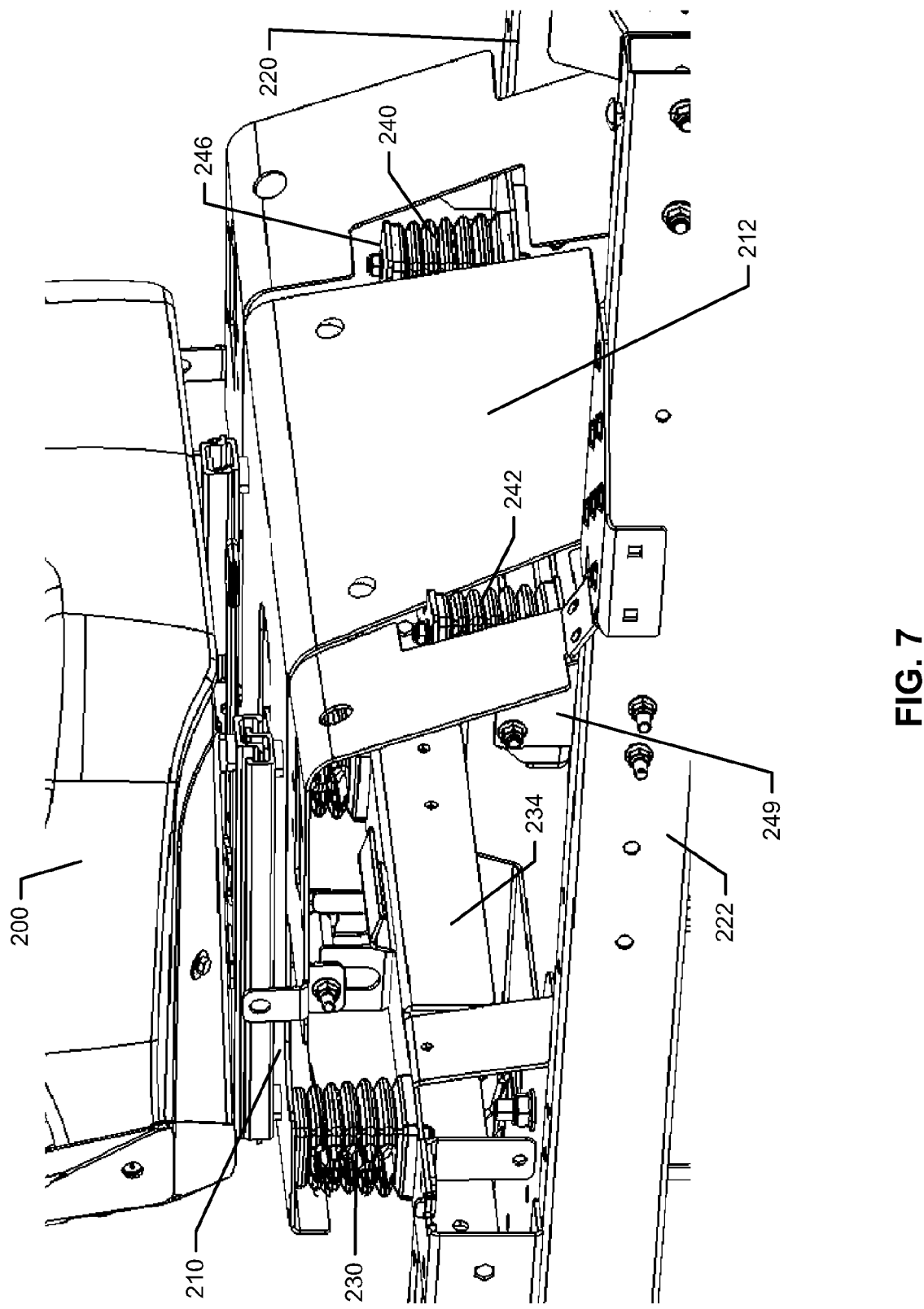
FIG. 7 is a front perspective view of various components of the isolation system in accordance with an example embodiment.
Figure 8:
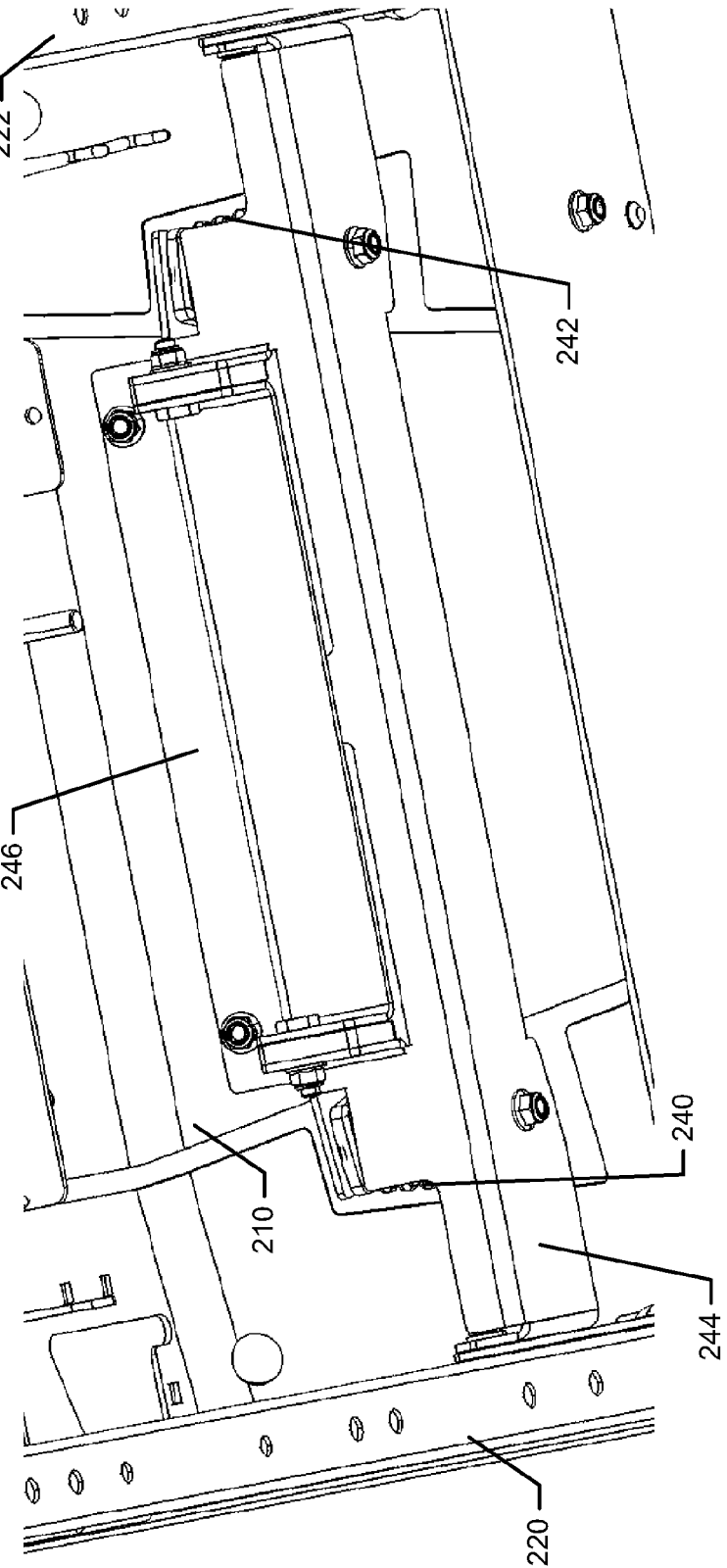
FIG. 8 is a perspective view of various components of the isolation system from below in accordance with an example embodiment.
Figure 9:
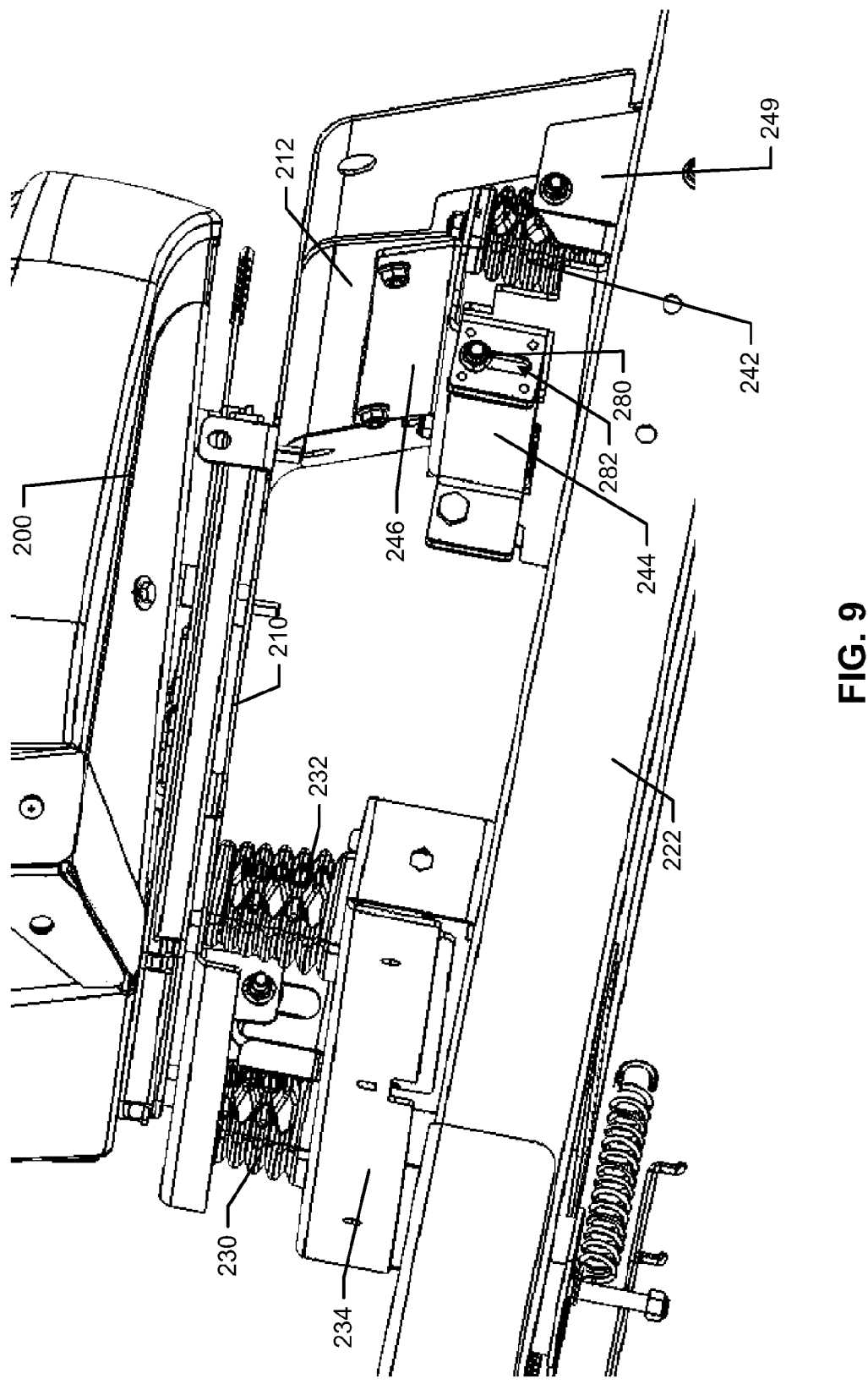
FIG. 9 is a perspective side view of various components of the isolation system in accordance with an example embodiment.
Figure 10:
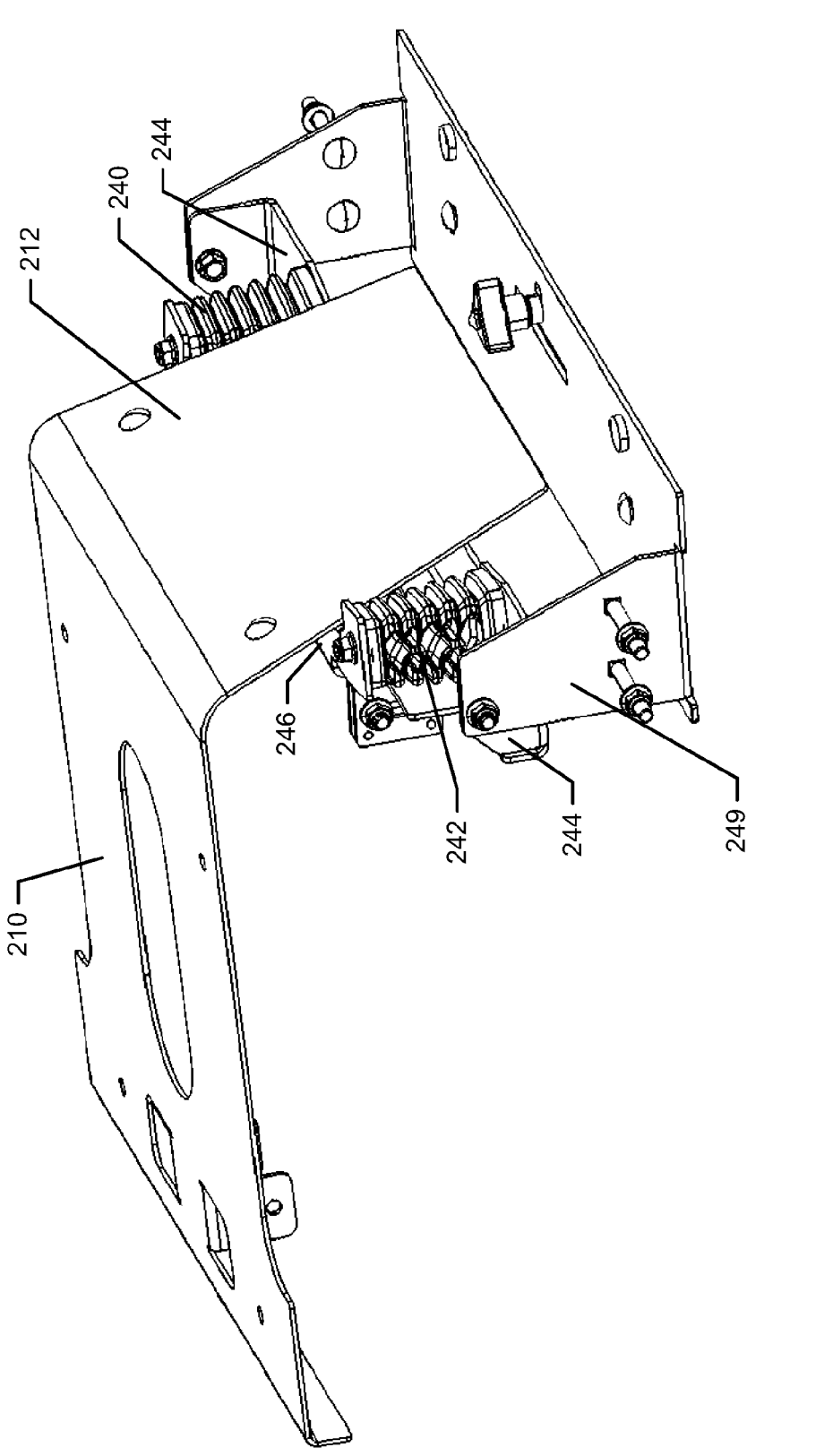
FIG. 10 is a front perspective view of a seat mounting structure and hinge assembly in isolation in accordance with an example embodiment.
Figure 11:
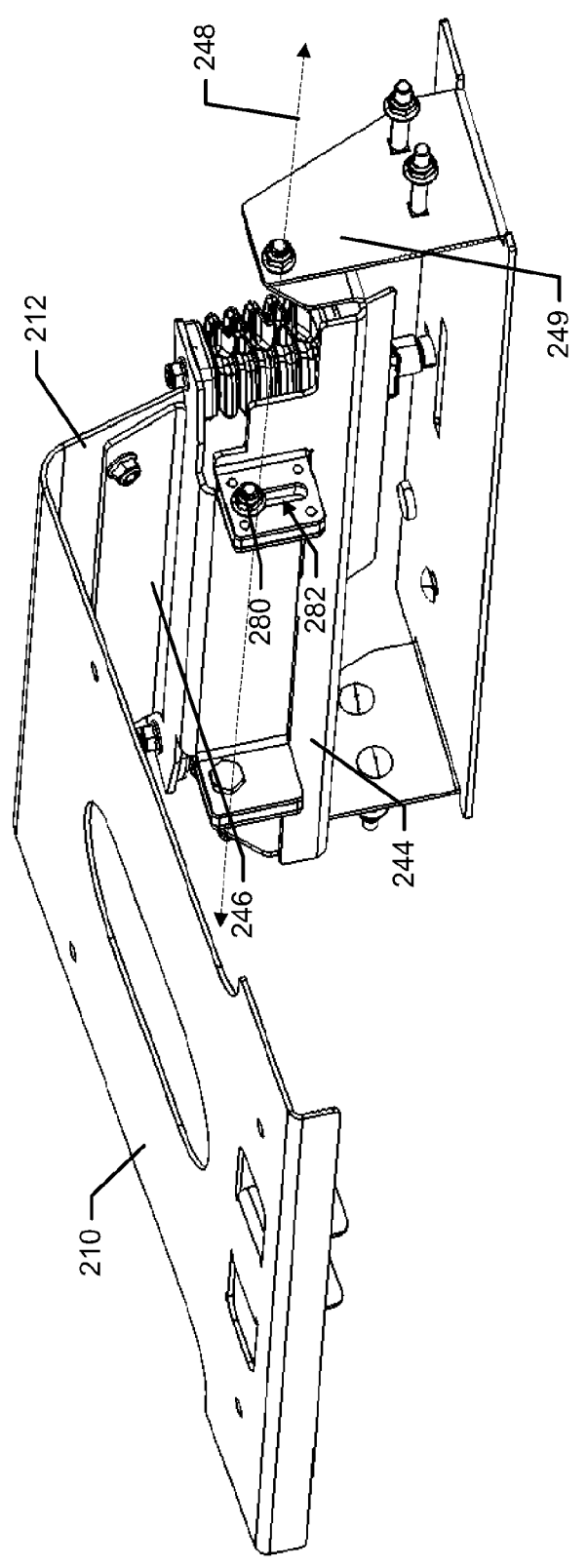
FIG. 11 is a rear perspective view of the seat mounting structure and hinge assembly in isolation in accordance with an example embodiment.
Figure 12:
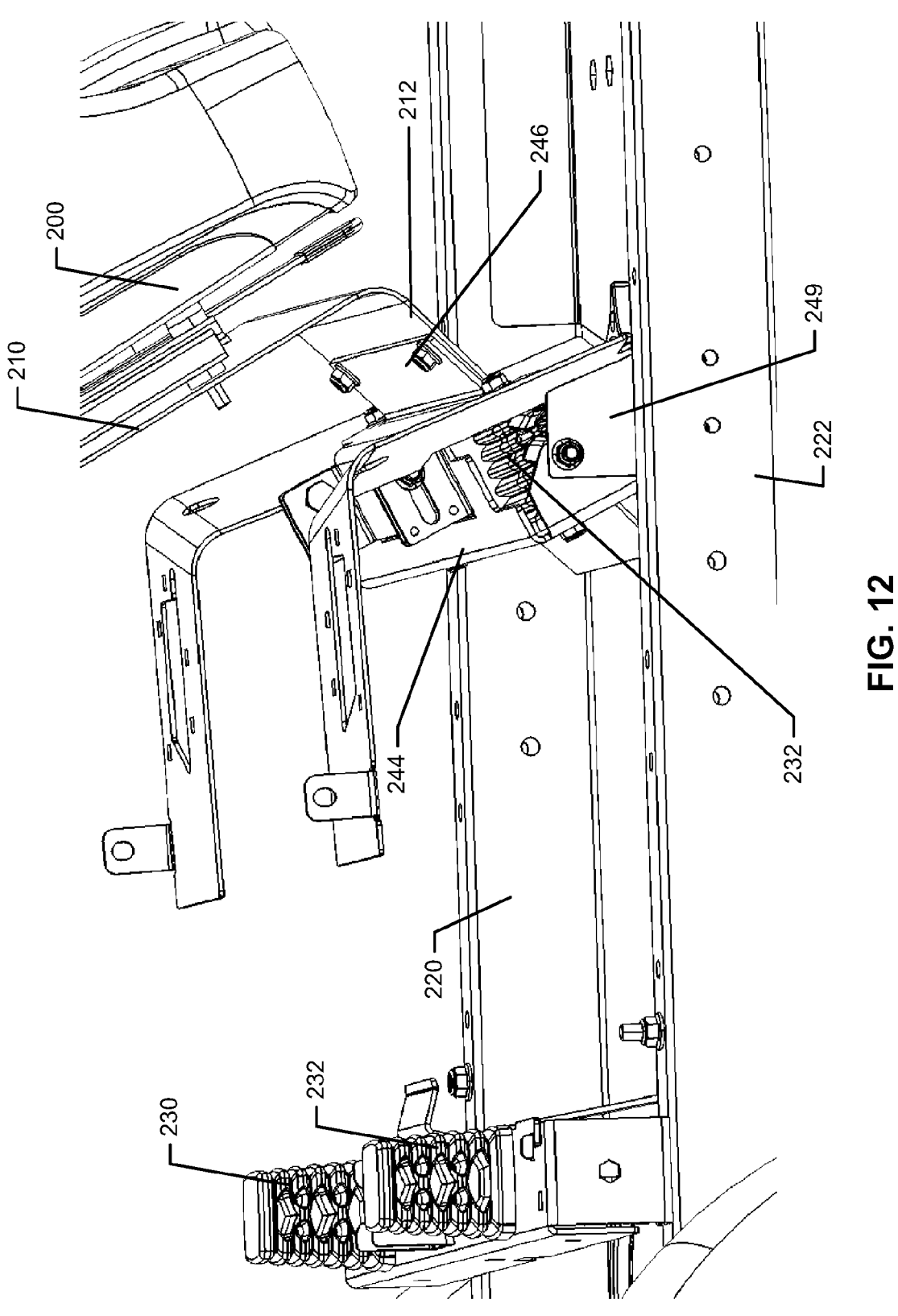
FIG. 12 is a side view of the seat in a pivoted position in accordance with an example embodiment.
Figure 13:
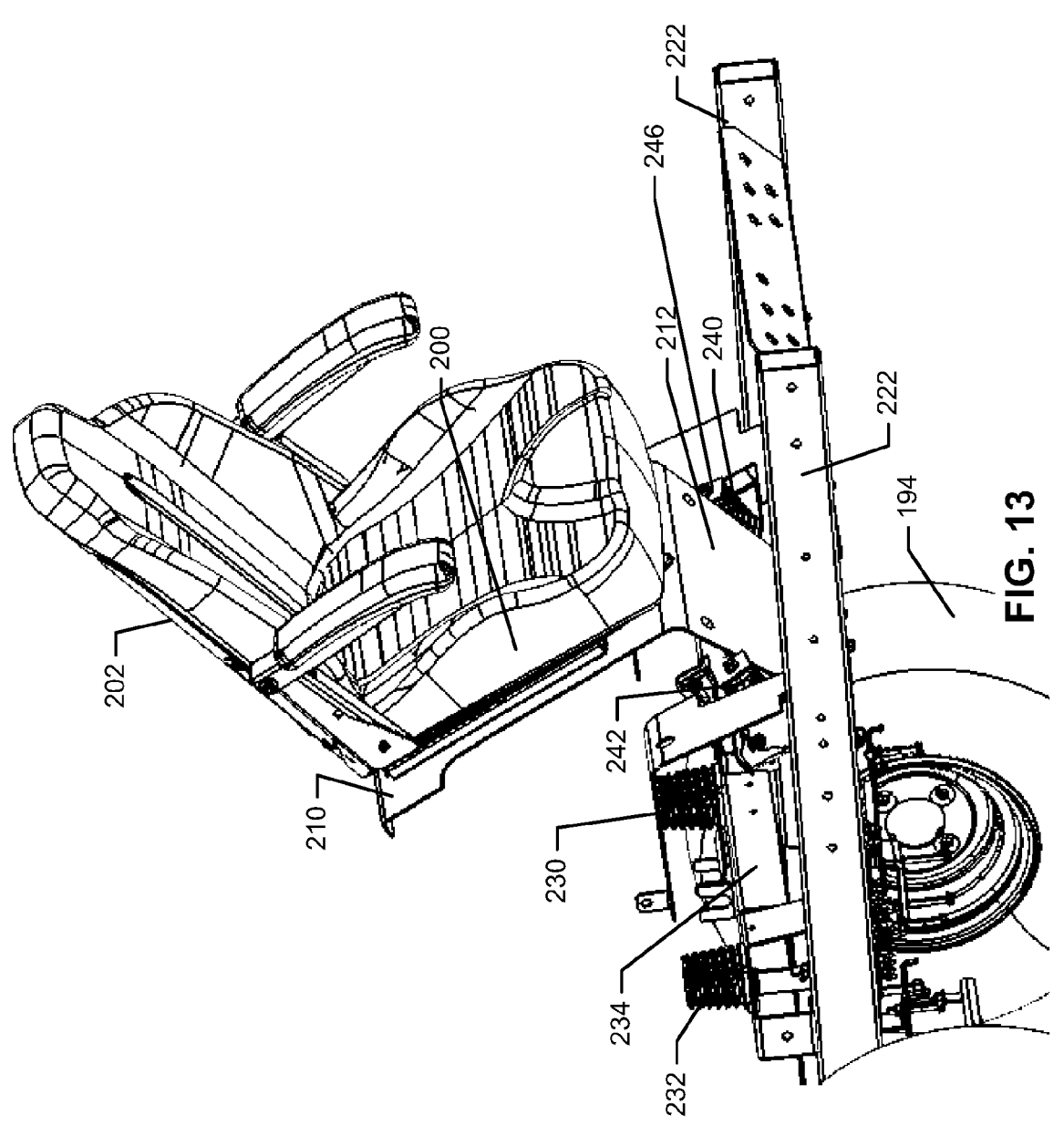
FIG. 13 is a front perspective view of the seat in a pivoted position in accordance with an example embodiment.

The isolator support bracket 234 to which the first and second isolators 230 and 232 are operably coupled may extend transversely across the riding lawn care vehicle 190 between the first and second lateral frame members 220 and 222. In an example embodiment, the isolator support bracket 234 may be bolted (at each opposing end thereof) to respective ones of the first and second lateral frame members 220 and 222 and the first and second isolators 230 and 232 may be affixed to a top portion of the isolator support bracket 234 (as shown in FIG. 4). The base support 210 of the seat mounting structure 120 may then be pivoted into and out of contact with a top portion of the first and second isolators 230 and 232 at a rear end of the base support 210. However, as an alternative, the isolator support bracket 234 may be bolted to the first and second lateral frame members 220 and 222, but the first and second isolators 230 and 232 may be configured to pivot with the base support 210 when the seat 110 is pivoted to the pivoted position. In such an example, only the first and second isolators 230 and 232 (and not the isolator support bracket 234) pivot with the seat 110.

The frame engaging bracket 244 may be pivotally attached at each opposing end thereof to the first and second lateral frame members 220 and 222. Thus, a pivot axis 248 about which the pivot member 212 pivots relative to the first and second lateral frame members 220 and 222 may be defined at or proximate to the frame engagement bracket 244. In some cases, a pivot bracket 249 may be provided with a screw, bolt, post or other fastener through or about which the pivot axis 248 may be defined. Thus, for example, an instance of the pivot bracket 249 may be provided at each respective one of the first and second lateral frame members 220 and 222 to interface with opposing ends of the frame engaging bracket 244 and form a pivot joint.

The seat mount engaging bracket 246 may be attached to the pivot member 212 (e.g., at a rear face of the pivot member 212). The third isolator 240 and the fourth isolator 242 may be disposed between the seat mount engagement bracket 246 and the frame engaging bracket 244. In some cases, the seat mount engaging bracket 246 and the frame engaging bracket 244 may be slidably coupled to each other, e.g., via cooperation of a protruding member 280 and slot 282 provided at respective ones of the seat mount engaging bracket 246 and the frame mount engaging bracket 244. In some cases, the protruding member 280 and the slot 282 may cooperate with each other to prevent lateral roll of the seat 110.

The fact that the seat mount engaging bracket 246 is rigidly attached to the pivot member 212, while also being slidingly engaged with the frame engaging bracket 244 means that the third and fourth isolators 240 and 242 can absorb any relative motion (e.g., due to vibration or bounce at the frame 130) between the seat mount engaging bracket 246 and the frame engaging bracket 244. Moreover, given that the frame engaging bracket 244 is pivotally mounted to the first and second lateral frame members 220 and 222, the entire hinge assembly 150 pivots when the seat 110 is pivoted to the pivoted position. More specifically, when the seat 110 is pivoted from the position shown in FIG. 3 forward to the position shown in FIG. 4 (as shown by arrow 290), the frame engaging bracket 244 pivots about the pivot axis 248 (in the direction of arrow 290). The pivot of the frame engaging bracket 244 causes the third and fourth isolators 240 and 242 to be carried along with the seat mount engaging bracket 246 during the pivot. The pivot member 212 is therefore also carried forward along with the base support 210 and both the seat base 200 and seat back 202. Accordingly, as shown in FIG. 4, all of the isolators (i.e., the first and second isolators 230 and 233 and the third and fourth isolators 240 and 242) are pivoted with the seat 110 in the transition to the pivoted position of FIG. 4. Thus, for example, the isolators transition from a substantially vertical orientation to a pivoted orientation.

The structure described above ensures that both the front and back of the seat 110 are vibration isolated, but the seat 110 is still able to be pivoted to expose the area under the seat 110. The ability to pivot a fully vibration-isolated seat maximizes both the storage capacity and accessibility of the space beneath the seat 110, and also maximizes the comfort of the operator.

Accordingly, some example embodiments may enable maximization of space utilization (particularly of space under the seat) and vibration isolation. In this regard, some embodiments may provide a riding lawn care vehicle that may include a frame to which wheels of the riding lawn care vehicle are attachable, a seat from which an operator of the riding lawn care vehicle is enabled to access steering controls for the riding lawn care vehicle, a seat mounting structure to which the seat is mounted, an isolation assembly providing vibration isolation between the frame and the seat mounting structure, and a hinge assembly configured to enable the seat to be pivoted via the seat mounting structure from an operating position to a pivoted position in which an area under the seat is exposed or accessible. The hinge assembly and at least a portion of the isolation assembly may be integrated to isolate the seat from vibrations at the frame. Alternatively or additionally, the hinge assembly and a portion of the isolation assembly (e.g., the portion integrated with the hinge assembly) may be configured to rotate or pivot together when the seat is pivoted to the pivoted position.

The riding lawn care vehicle (or seat isolation system) of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the isolation assembly may include a first isolation portion disposed at a first side of the seat mounting structure, and a second isolation portion disposed at a second side of the seat mounting structure. The hinge assembly may be configured to define a pivot axis proximate to the first side of the seat mounting structure. In an example embodiment, the second isolation portion may include a first isolator and a second isolator disposed at the first side of the seat mounting structure, and the first and second isolators may be operably coupled to an isolator support bracket that extends from a first lateral frame member of the frame to a second lateral frame member of the frame. In some cases, the first and second isolators and the isolator support bracket may be carried with the seat mounting structure responsive to pivoting the seat to the pivoted position. In an example embodiment, the first isolation portion may include a third isolator and a fourth isolator disposed at the second side of the seat mounting structure, and the third and fourth isolators may pivot about the pivot axis responsive to pivoting the seat to the pivoted position. In an example embodiment, the seat mounting structure may include a base support operably coupled to a seat base of the seat and a pivot member operably coupled to a front or rear edge of the seat base, and the pivot member may be operably coupled to the hinge assembly to carry the seat from the operating position to the pivoted position responsive to operation of the hinge assembly. In some cases, the hinge assembly may include a seat mount engaging bracket attached to the pivot member, and a frame engaging bracket pivotally mounted to a first lateral frame member and a second lateral frame member of the frame. The isolation assembly may include at least one isolator disposed between the frame engaging bracket and the seat mount engaging bracket. In some cases, the at least one isolator may rotate with the pivot member responsive to pivoting of the pivot member about a pivot axis disposed at the frame engaging bracket. In some cases, the frame engaging bracket and the seat mount engaging bracket may be slidingly engaged with each other via a slot and protrusion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:

a frame to which wheels of the riding lawn care vehicle are attachable;

a seat from which an operator of the riding lawn care vehicle is enabled to access steering controls for the riding lawn care vehicle;

a seat mounting structure to which the seat is mounted;

an isolation assembly providing vibration isolation between the frame and the seat mounting structure;

a foot support platform disposed between a first lateral frame member of the frame and a second lateral frame members of the frame; and a hinge assembly configured to enable the seat to be pivoted via the seat mounting structure from an operating position to a pivoted position in which an area under the seat is exposed or accessible, wherein the hinge assembly and at least a portion of the isolation assembly are integrated to spring isolate the hinge assembly from the seat mounting structure in order to isolate the seat from vibrations at the frame, and wherein the hinge assembly is disposed between the seat mounting structure and the foot support platform such that the seat mounting structure pivots relative to the foot support platform.

2. The riding lawn care vehicle of claim 1, wherein the isolation assembly comprises a first isolation portion disposed at a first side of the seat mounting structure, and a second isolation portion disposed at a second side of the seat mounting structure, and wherein the hinge assembly is configured to define a pivot axis proximate to the first side of the seat mounting structure.

3. The riding lawn care vehicle of claim 2, wherein the second isolation portion comprises a first isolator and a second isolator disposed at the second side of the seat mounting structure, and wherein the first and second isolators are operably coupled to an isolator support bracket that extends from the first lateral frame member of the frame to the second lateral frame member of the frame.

4. The riding lawn care vehicle of claim 3, wherein the first and second isolators and the isolator support bracket are carried with the seat mounting structure responsive to pivoting the seat to the pivoted position.

5. The riding lawn care vehicle of claim 3, wherein the first isolation portion comprises a third isolator and a fourth isolator disposed at the first side of the seat mounting structure, and wherein the third and fourth isolators pivot about the pivot axis responsive to pivoting the seat to the pivoted position.

6. The riding lawn care vehicle of claim 1, wherein the seat mounting structure comprises a base support operably coupled to a seat base of the seat and a pivot member operably coupled to a front or rear edge of the seat base, and wherein the pivot member is operably coupled to the hinge assembly to carry the seat from the operating position to the pivoted position responsive to operation of the hinge assembly.

7. The riding lawn care vehicle of claim 6, wherein the hinge assembly comprises a seat mount engaging bracket attached to the pivot member, and a frame engaging bracket pivotally mounted to the first lateral frame member and the second lateral frame member of the frame, and wherein the isolation assembly comprises at least one isolator disposed between the frame engaging bracket and the seat mount engaging bracket.

8. The riding lawn care vehicle of claim 7, wherein the at least one isolator rotates with the pivot member responsive to pivoting of the pivot member about a pivot axis disposed at the frame engaging bracket.

9. The riding lawn care vehicle of claim 8, wherein the frame engaging bracket and the seat mount engaging bracket are slidingly engaged with each other via a slot and protrusion.

10. The riding lawn care vehicle of claim 1, wherein the isolation assembly pivots with the hinge assembly responsive to pivoting the seat to the pivoted position.

11. A vibration isolation system for a riding lawn care vehicle, the system comprising:

a seat from which an operator of the riding lawn care vehicle is enabled to access steering controls for the riding lawn care vehicle;

a seat mounting structure to which the seat is mounted;

an isolation assembly providing vibration isolation between a frame of the riding lawn care vehicle and the seat mounting structure;

a foot support platform disposed between a first lateral frame member of the frame and a second lateral frame members of the frame; and a hinge assembly configured to enable the seat to be pivoted via the seat mounting structure from an operating position to a pivoted position in which an area under the seat is exposed or accessible, wherein the hinge assembly and at least a portion of the isolation assembly are integrated to spring isolate the hinge assembly from the seat mounting structure in order to isolate the seat from vibrations at the frame, wherein the hinge assembly and a portion of the isolation assembly both pivot responsive to pivoting the seat to the pivoted position, and wherein the hinge assembly is disposed between the seat mounting structure and the foot support platform such that the seat mounting structure pivots relative to the foot support platform.

12. The system of claim 11, wherein the isolation assembly comprises a first isolation portion disposed at a first side of the seat mounting structure, and a second isolation portion disposed at a second side of the seat mounting structure, and wherein the hinge assembly is configured to define a pivot axis proximate to the first side of the seat mounting structure.

13. The system of claim 12, wherein the second isolation portion comprises a first isolator and a second isolator disposed at the second side of the seat mounting structure, and wherein the first and second isolators are operably coupled to an isolator support bracket that extends from the first lateral frame member of the frame to the second lateral frame member of the frame.

14. The system of claim 13, wherein the first and second isolators and the isolator support bracket are carried with the seat mounting structure responsive to pivoting the seat to the pivoted position.

15. The system of claim 13, wherein the first isolation portion comprises a third isolator and a fourth isolator disposed at the first side of the seat mounting structure, and wherein the third and fourth isolators pivot about the pivot axis responsive to pivoting the seat to the pivoted position.

16. The system of claim 11, wherein the seat mounting structure comprises a base support operably coupled to a seat base of the seat and a pivot member operably coupled to a front or rear edge of the seat base, and wherein the pivot member is operably coupled to the hinge assembly to carry the seat from the operating position to the pivoted position responsive to operation of the hinge assembly.

17. The system of claim 16, wherein the hinge assembly comprises a seat mount engaging bracket attached to the pivot member, and a frame engaging bracket pivotally mounted to the first lateral frame member and the second lateral frame member of the frame, and wherein the isolation assembly comprises at least one isolator disposed between the frame engaging bracket and the seat mount engaging bracket.

18. The system of claim 17, wherein the at least one isolator rotates with the pivot member responsive to pivoting of the pivot member about a pivot axis disposed at the frame engaging bracket.

19. The system of claim 18, wherein the frame engaging bracket and the seat mount engaging bracket are slidingly engaged with each other via a slot and protrusion.

\* \* \* \* \*